United States Patent [19]

Evers

[11] Patent Number: 5,259,460
[45] Date of Patent: Nov. 9, 1993

[54] DEVICE FOR WORKING THE GROUND

[75] Inventor: Johann Evers, Daarlerveen, Netherlands

[73] Assignee: Evers Research B.V., Daarlverveen, Netherlands

[21] Appl. No.: 848,978

[22] PCT Filed: Oct. 19, 1990

[86] PCT No.: PCT/NL90/00157

§ 371 Date: Jun. 15, 1992

§ 102(e) Date: Jun. 15, 1992

[87] PCT Pub. No.: WO91/05458

PCT Pub. Date: May 2, 1991

[30] Foreign Application Priority Data

Oct. 19, 1989 [NL] Netherlands .................. 8902596

[51] Int. Cl.$^5$ .................. A01B 5/00; A01B 23/06
[52] U.S. Cl. .................. 172/576; 172/603; 172/569; 172/574
[58] Field of Search ........... 172/574, 569, 576, 602, 172/603

[56] References Cited

U.S. PATENT DOCUMENTS

| 301,597 | 7/1884 | Horst | 172/574 |
|---|---|---|---|
| 796,942 | 8/1905 | Stafford et al. | 172/603 |
| 802,068 | 10/1905 | Case | 172/569 |
| 833,841 | 10/1906 | Maiers | 172/569 |
| 876,145 | 1/1908 | Buchet et al. | 172/569 |
| 1,014,987 | 1/1912 | Weiler | 172/569 |
| 1,253,175 | 1/1918 | High | 172/574 |
| 1,292,697 | 1/1919 | Bridgen | 172/574 |
| 2,659,291 | 11/1953 | Tanke | 172/603 |
| 2,768,864 | 10/1956 | Krehbiel | |
| 3,244,237 | 4/1966 | Keplinger et al. | 172/574 |
| 3,675,725 | 7/1972 | Shultz | 172/245 |
| 3,931,858 | 1/1976 | North | 172/63 |
| 4,180,135 | 12/1979 | Birkenbach et al. | 172/407 |
| 4,574,891 | 3/1986 | Williamson | 172/602 |
| 4,607,705 | 8/1986 | Tebben | 172/574 |
| 4,815,544 | 3/1989 | Good | 172/574 |
| 4,928,774 | 5/1990 | Bell | 172/574 |

FOREIGN PATENT DOCUMENTS

| 280048 | 8/1988 | European Pat. Off. |
| 905434 | 4/1950 | Fed. Rep. of Germany |
| 3513945 | 8/1986 | Fed. Rep. of Germany |
| 2183631 | 12/1973 | France |
| 2184332 | 12/1989 | United Kingdom |

Primary Examiner—Randolph A. Reese
Assistant Examiner—Spencer Warwick
Attorney, Agent, or Firm—Webb, Burden, Ziesenheim & Webb

[57] ABSTRACT

A device for working the ground comprising a frame and a plurality of discs. Each disc is rotatably mounted on a shaft which is provided on the free end of a pivotable standing shaft. In order to prevent jamming of the discs by earth thrown up by adjacent discs, each standing shaft is placed on the concave side of its associated disc. The shafts are inclined relative to the ground, thus providing an improved working of the ground. The spacing between adjacent discs is adjustable as is the orientation of the discs.

3 Claims, 2 Drawing Sheets

DEVICE FOR WORKING THE GROUND

BACKGROUND OF THE INVENTION

The present invention relates to a device for working the ground comprising a frame with a plurality of standing shafts mounted pivotally thereon, each of which is provided on a free end with a lying shaft whereon a disc-shaped body is rotatably mounted, wherein each disc-shaped body has a concave and a convex side. Such a device is known from the U.S. Pat. No. 3,675,725.

Such a device (normally known as a disc harrow) is used in agriculture for further working of ploughed earth, for ploughing under seed and manure and/or for weed control. It is of great importance in these workings to keep the working depth, i.e. the depth to which the discs work the ground, substantially unchanged. A disc harrow is generally fixed for this purpose to a so-called three-point lifting device that forms part of a tractor and with which the position of the harrow relative to the tractor, and therewith the working depth is controlled.

SUMMARY OF THE INVENTION

The device according to the present invention differs from conventional disc harrows wherein the discs are jointly fixed to one continuous shaft in that each disc is arranged on the end of a separate, pivotable standing shaft. This has the great advantage that the angle between the rotating shaft of the discs and the direction of movement of the tractor (the setting angle) can be varied without a continuous shaft having to be swivelled for this purpose through the desired setting angle. Thus prevented is that the discs on one of the outer ends of the harrow are moved far behind the tractor and that their working depth can no longer be properly controlled by the lifting device. In the device according to the present invention the setting angle of the discs can be varied without the distance between the discs and the tractor changing, whereby, using the lifting device, a virtually constant working depth can be simply maintained.

The disc harrow known from U.S. Pat. No. 3,675,725 has the great drawback, however, that the standing pivot shafts ar placed on the convex side of the discs connected thereto. This results in the danger of earth thrown up by an adjacent disc collecting and clogging between the standing pivot shaft and the disc, whereby the discs can jam.

The present invention therefore has for its object to provide a ground working device of the above described type wherein the above stated drawback does not occur. This is achieved according to the invention in that each standing pivot shaft is placed on the concave side of its associated disc-shaped body. Thus obtained is a reliable and robust disc harrow with separately pivotable discs which is suitable for use in a large number of ground types.

In preference the convex side is substantially smooth. This prevents earth possibly clogging on the convex side whereby bearings that may run through the disc-shaped bodies to the convex side could become jammed.

A very good working of the ground is obtained when during working each rotating shaft runs in inclined position relative to the ground. Each disc thereby as it were "digs" the ground whereby this is well loosened.

The disc is shaped in order to prevent earth that may be carried onto the concave side of a disc being able to collect between the disc and its pivot shaft, whereby the disc could become jammed.

The soil working device can be further provided with means arranged at the rear of the frame for attaching a height-adjustable cultivator. Because the cultivator tends to dig itself into the ground the working depth of the discs is kept constant to an event greater extent.

BRIEF DESCRIPTION OF THE DRAWINGS

Mentioned and other features of the device according to the present invention will be elucidated on the basis of an embodiment, wherein reference is made to the annexed drawing in which corresponding reference numerals designate corresponding components, and wherein.

DESCRIPTION OF THE PREFERRED EMBODIMENT

Figure 1:
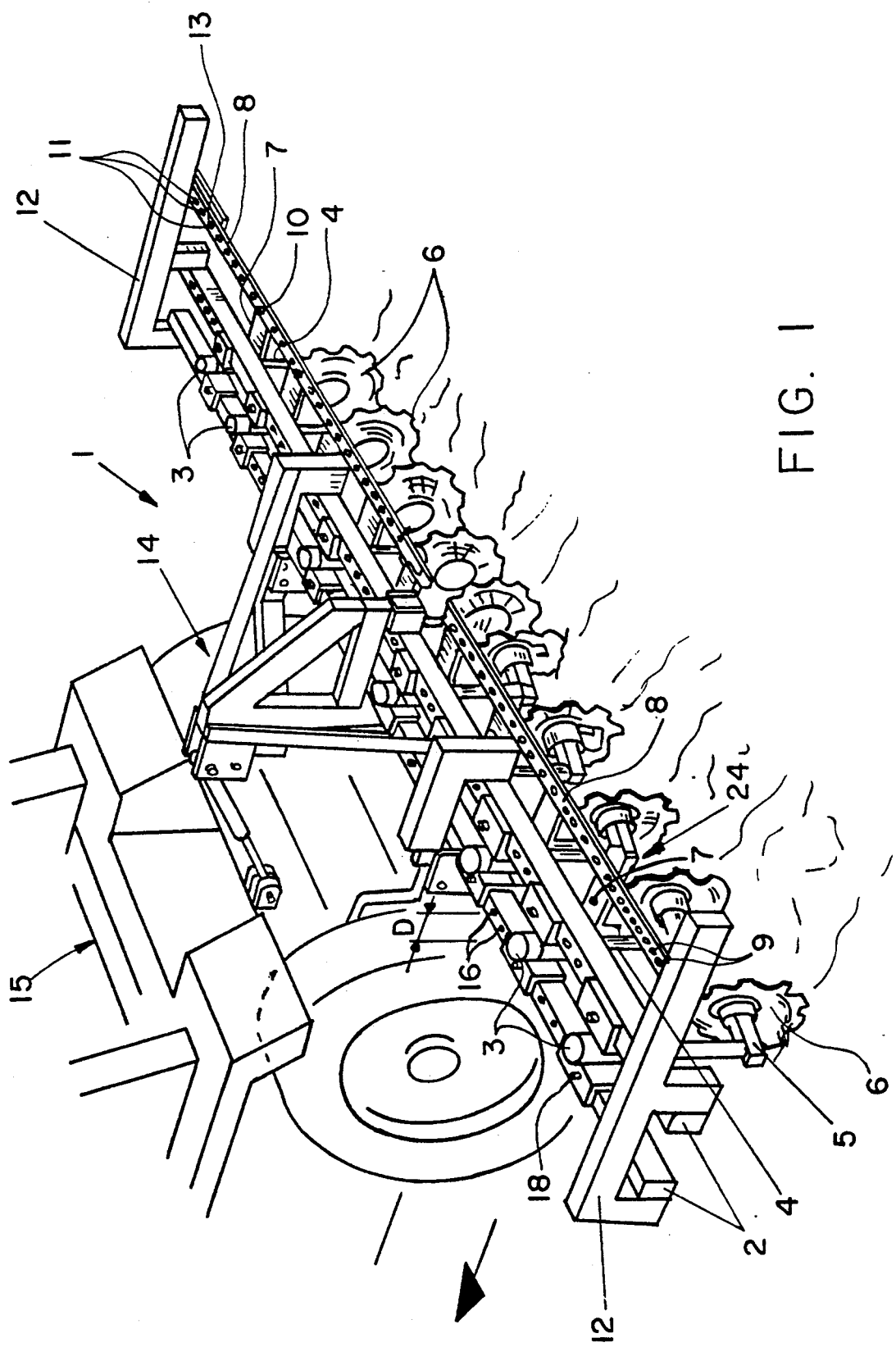
FIG. 1 shows a perspective view of a first embodiment of the device according to the invention.

A ground working device 1 (FIG. 1) normally designated as a disc harrow comprises a frame 2 in divided form whereon at regular mutual intervals between both parts bearing means 3 are suspended by means of gripping members 23. Pivotally mounted in the bearing means 3 are the first outer ends of standing shafts 4. The free ends of the standing pivot shafts 4 are provided with lying shafts 5 on which disc-shaped bodies 6 are rotatably mounted. The pivot shafts 4 are arranged on the concave side of each disc-shaped body 6 so that earth thrown up by an adjacent disc-shaped body 6 cannot collect and clog between the pivot shaft 4 and the disc-shaped body 6. Jamming of the disc-shaped body 6 is thus prevented.

For adapting of the setting angle of the disc-shaped bodies 6 the disc harrow 1 is provided with setting means 24.

Because the disc-shaped bodies 6 are each pivotable relative to the frame 2 the later does not have to swivel relative to the direction of movement of the tractor 15. The distance D between the rear wheels of tractor 15 and the device 1 can thereby be minimal and owing to the short-moment arm the working depth of the disc-shaped bodies 6 can be well controlled by the lifting device of an agricultural tractor 15.

Figure 2:
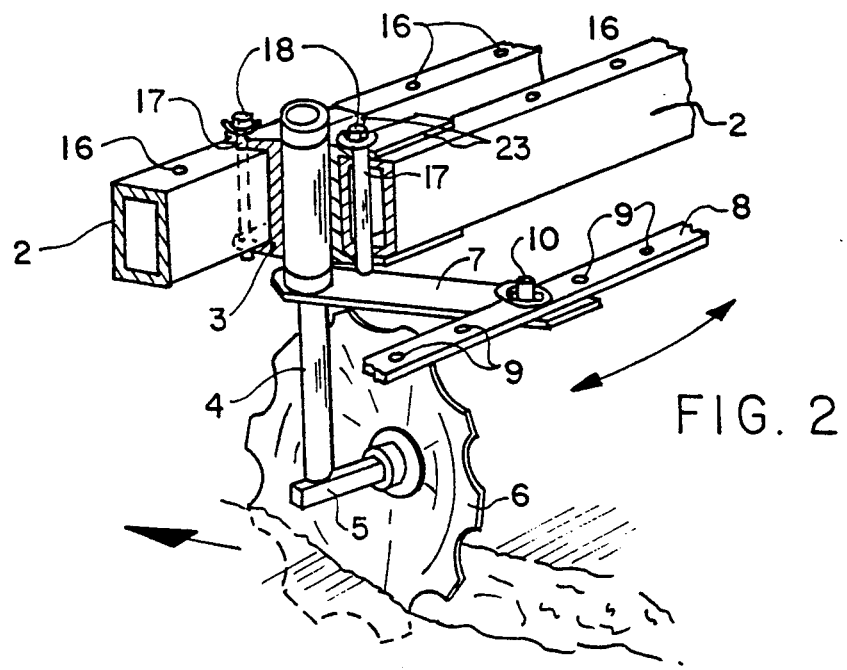
FIG. 2 is a partially sectional view of a detail of the setting means of the device.

Fixed to each pivot shaft 4 is a first extremity of a radially extending adjusting body 7 (FIG. 2). The other extremity of the body 7 is provided with a hole which co-acts with an opening 9 arranged in an adjusting member 8 and with detachable pin-like fixation means 10 to attach the adjusting body 7 pivotally to the adjusting member 8. The outer end of the adjusting member 8 is likewise provided with a number of openings 11 which co-act with an opening arranged in a connecting member 12 joining both frame parts 2, 2 and second detachable pin-like fixation means 13 to fix the adjusting member 8 in a determined position relative to the frame 2.

The disc harrow 1 further comprises a frame 14 with which the harrow 1 is attached to a three-point lifting device arranged on the rear of tractor 15. In order to prevent the occurrence of transverse forces and moments around the top axis of the tractor 15 the harrow 1 in the embodiment shown here is of symmetrical construction relative to the center line of the tractor 15.

To change the setting angle of the disc-shaped bodies 6 the disc harrow 1 is raised by the lifting device so far that the disc-shaped bodies 6 are free of the ground, whereafter the pin-like fixation means 13 connecting an opening 11 and an opening in the connecting member 12 is released, the adjusting member 8 is moved such that the disc-shaped bodies 6 are pivoted by the adjusting bodies 7 in the desired direction and the disc-shaped bodies 6 are fixed in their new position by placing the releasable pin-like fixation means 13 through one of the other openings 11 and the opening in the connecting member 12.

The shape of the standing pivot shaft 4 is adapted to the curvature of the disc-shaped body 6 which prevents any earth adhering to the concave side of the body 6 from collecting at the location of the pivot shaft 4, whereby the disc-shaped body 6 would still become jammed.

It may be desired to vary the distance in transverse direction between the various disc-shaped bodies 6. To this end the bearing means 3 in which each standing pivot shaft 4 is mounted can be releasably arranged on the frame (FIG. 1). The bearing means 3 can then be displaced in transverse direction and fixed in particular desired positions by means of pin-hole connections 16-18.

Figure 3:
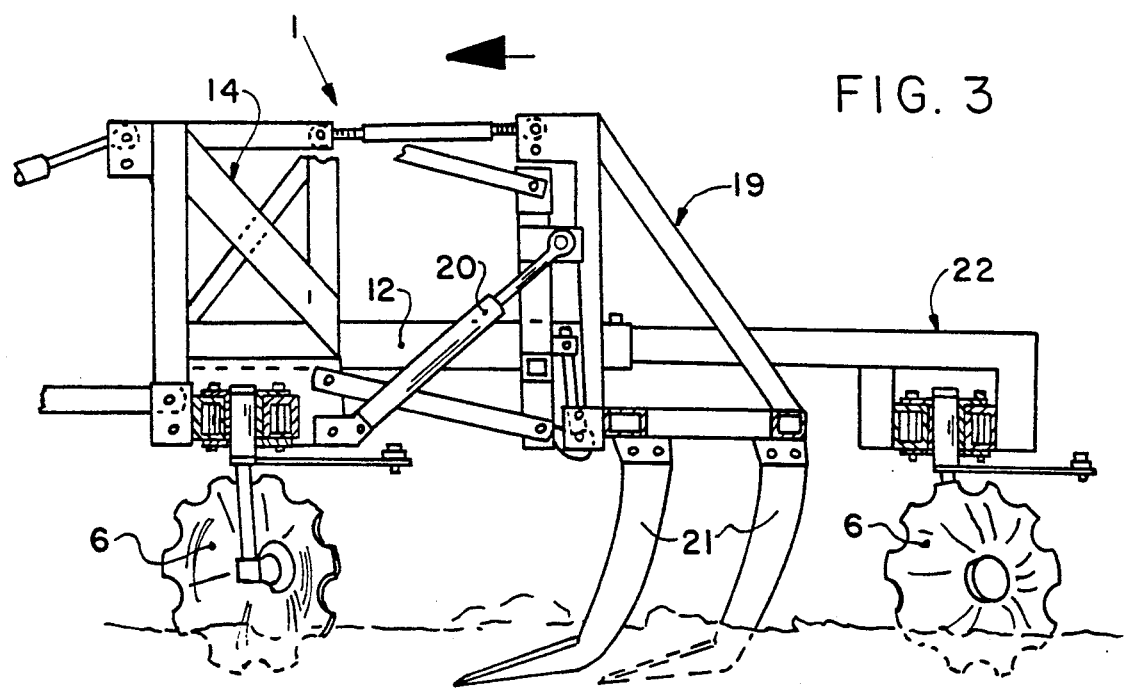
FIG. 3 is a side view of a device according to the invention having attached thereto a cultivator and a second device according to the invention.

By attaching a cultivator 19 to the frame 14 of the first disc harrow 1 in the manner shown in FIG. 3 the working depth of the disc-shaped bodies 6 can be precisely controlled. The position of the cultivator 19 relative to the disc harrow 1 is controlled using (for instance hydraulic) adjusting means 20. When the harrow 1 is lowered by the lifting device fixed to tractor 15 the teeth 21 of the cultivator will dig themselves in and, depending on the position of the adjusting means 20, pull the disc-shaped bodies 6 of the device 1 to a greater or lesser degree into the ground. Thus obtained is a virtually constant working depth.

The embodiment of the device 1 shown here comprises a second device 22 according to the invention fixed to the elongation of connecting members 12, 12. The addition of a second disc harrow 22 is of importance if the first harrow 1 is provided with disc-shaped bodies 6 which are all positioned in the same direction and which is thus asymmetrical. Use of a single disc harrow 1 results namely in such a came in the occurrence of transverse forces and moments making the tractor 15 difficult to control.

I claim:

1. A device for working the ground including at least one disc harrow comprising:
   a frame means including a tractor coupling frame member, a pair of parallel frame parts attached to said tractor coupling frame member, and connecting members joining said frame parts at opposed ends of said frame parts, wherein a plurality of pin holes are positioned along substantially the entire length of said frame parts;
   a plurality of standing shafts pivotably mounted on said frame parts, each said standing shaft being supported on a bearing means which is attached to a pair of gripping members, said gripping members overlap said frame parts and are secured to said frame parts by pin members which are adapted to extend through said gripping members and be received in said pin holes, whereby said standing shafts are adapted to be mounted at a plurality of locations along substantially the entire length of said frame parts;
   a radially extending adjusting body attached to each said standing shaft;
   an adjusting member extending between said connecting members, said adjusting member attached to each said adjusting body and adjustably attached to said connecting members, wherein changing the position of said adjusting member relative to said connecting members will change the orientation of each said disc-shaped body relative to said frame means;
   a disc shaft attached to an end of each said standing shaft which is below said frame parts; and
   a disc-shaped body having a concave surface side and a convex surface side rotatably mounted on said disc shaft, wherein each said standing shaft is positioned on said concave surface side of an associated disc-shaped body.

2. The ground working device of claim 1 further comprising two said disc harrows with the second said disc harrow positioned behind the first said disc harrow, wherein said concave surface side of each said disc-shaped body of said first disc harrow faces a first direction and said concave surface side of each said disc-shaped body of said second harrow faces an opposite direction.

3. The ground working device of claim 1 further comprising a height-adjustable cultivator attached to said at least one disc harrow.

* * * * *